Oct. 20, 1959  F. CANIGLIA  2,909,172
MILK BOILING CONTAINER
Filed Nov. 29, 1955
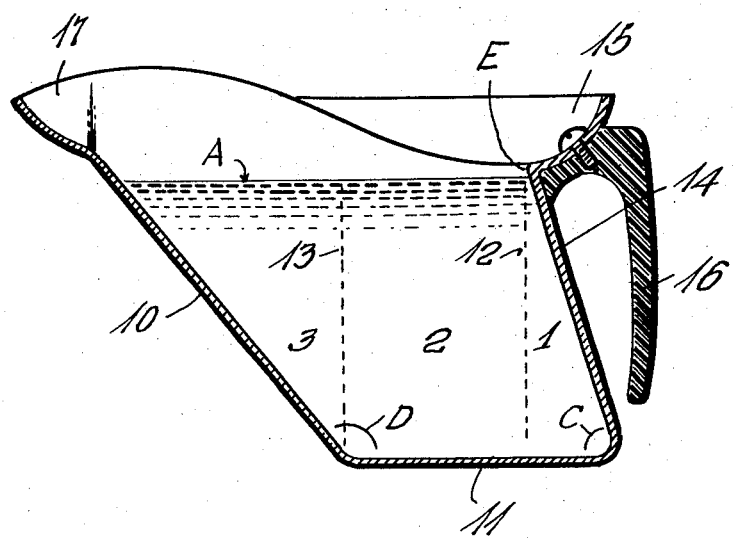
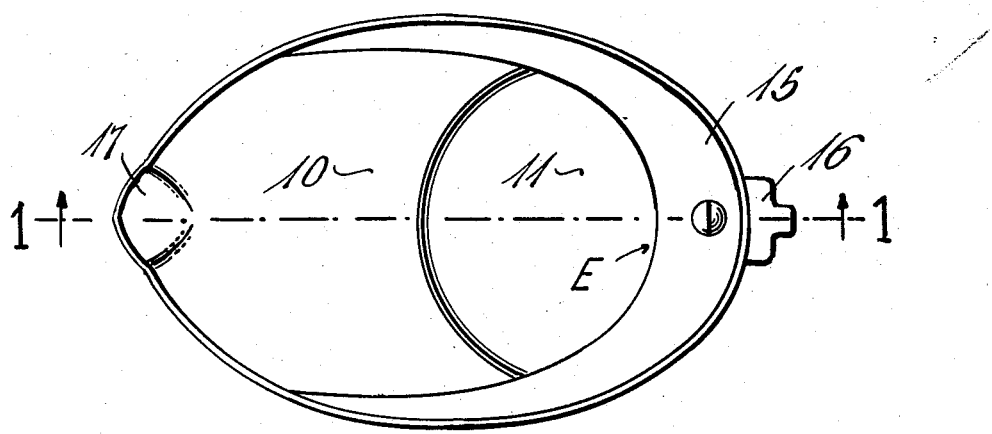
INVENTOR
FERRANTE CANIGLIA,
BY
Richardson, David & Nordon  ATTORNEYS

2,909,172
MILK BOILING CONTAINER
Ferrante Caniglia, San Benedetto Dei Marsi, Italy
Application November 29, 1955, Serial No. 549,808
Claims priority, application Italy December 2, 1954
3 Claims. (Cl. 126—386)

When milk is caused to boil in an ordinary container, on the surface of the liquid, inside the container, a film is produced, formed from cream covering the whole surface of milk. This dense film produced by heat prevents the vapor from passing through and, when the milk reaches the boiling point, by the increase of evaporation a pressure is produced, causing the cream to ascend until it flows out from the container.

The object of the present invention is to provide a special construction for the container, adapted to stop the effects produced by the phenomenon due to the ascending movement of the milk.

In effect, by causing milk to boil in a container inclined towards one side, or asymmetric in shape, the distribution of vapor and, consequently, the tension below the cream is no longer equal.

The invention is illustrated by way of example only, without any limitation, in the annexed drawing in which.

Fig. 1 is a sectional view of the container according to the invention, in a preferred form of embodiment taken along line 1—1 of Fig. 2 and Fig. 2 is a plan view of the container according to the invention, in a preferred form of embodiment.

Referring to the figures of the drawing, it will be seen that the method of putting into effect the invention has recourse to a container having almost the shape of a truncated cone, with an inclined wall 10 and with the relatively smaller base 11 used as bottom, so as to keep a portion of the surface of the wall 10 out of reach of the direct action of the heat. Vertical dotted lines 12 and 13 divide the container into imaginary zones 1, 2, 3. In these conditions the vapor from the bottom of the container ascends vertically and collects mainly below that part of the cream which corresponds to the surface of the bottom 11. The surface of cream indicated at A of Fig 1, instead, is left without vapor, owing to its being out of reach of the direct action of the heat. It follows that the cream merely rises on the sides of zone 1, moving away from the wall 14 of the container at that point, under the pressure of the rising vapors. The volume of cream at that point is quite small and the pressure of the vapors in zone 1 is sufficient to push it forwardly in the container in an ever widening arc on the surface, allowing the vapors to escape. The vapors are distributed over the three zones 1, 2, 3, by the heat acting directly on the first two zones. The vapor of zone 1, owing to the inclination of the wall 14 of the container, is conveyed to point E where, by being concentrated, it detaches the cream adhering to the wall at that point. The detached cream also undergoes the thrust of the vapor which ascends in zone 2 and shifts toward zone 3. This thrust is assisted by the rotation which the liquid mass undergoes by convection, thus relieving the pressure on the cream and preventing the boiling over of the milk. The escape of the vapors at point E, by tending to widen out, permits the vapors to evaporate over a large area.

Furthermore, the cream left in contact with the walls of the container in zone 2, owing to a skin effect, attracts the detached portion of the cream by shifting it from zone 1 to zone 2 and contributes to open a continually increasing passage for the vapor which is thus free to escape without causing the milk to flow over.

Lastly, in order to prevent a possible dripping of the outcoming vapor, the upper border of the container, near the handle 16, is slightly inclined downwardly and at this depression the container is provided with a convex expansion chamber 15, whereas on the opposite higher side said container is provided with a spout 17 so as to ease pouring of the liquid. The expansion chamber 15 catches and holds the milk which rises to a certain extent under the influence of the heat applied thereto. This chamber comprises a portion which is rearwardly dished out of the body of the container as shown at 15.

The circular wall of the container is substantially inclined in such a manner that, with respect to the bottom, internal angles are formed, one of which is an acute angle C and the other is an obtuse angle D. At any rate, the boiler may have a prismatical shape, a cylindrical shape, the shape of a truncated cone, or the shape of a truncated pyramid, etc., provided that the principle of its inclination be adopted. And this inclination is such that of the internal angles, at the base of the two sides with the bottom, one is an acute angle C and the other an obtuse angle D. The forwardly sloping portion 10 which forms an obtuse angle with base 11, is in reality an extension of the base or bottom 11, but is not exposed to the direct action of heat. The opposite portion, 14, forms an acute angle with respect to the base 11, both angles being considered from the interior of the container.

The advantages offered by this invention are obvious to anybody that knows the nuisance of overflowing milk and the offensive odors emanating therefrom. Moreover, the invention permits boiling for a rather longer time than in conventional devices, so as to entirely destroy Koch bacilli and other pathogenical microbes that may be present in the milk.

What I claim is:

1. A container for the open boiling of milk, comprising a horizontal base portion and an upwardly extending wall peripherally integral therewith so that said wall and base portion form an enclosure having an open side opposite said base portion, a first portion of said wall forming an acute internal angle with said base portion at the juncture therewith so that said first wall portion overhangs said base portion and vertically projects over a substantial part of said base portion, a second portion of said wall integral with, spaced from, and opposite to said first wall and forming an obtuse internal angle with said base portion at the juncture therewith, so that said second wall portion extends upwardly and outwardly from said base portion and thereby vertically projects outside said base portion, and an outwardly flaring wall portion at the upper end of the said first portion defining an expansion chamber.

2. A container according to claim 1, wherein the interior of said outwardly flaring wall portion is convexly shaped.

3. A container according to claim 1, also including a handle connected to the exterior of said wall portion which forms an acute angle with said base portion.

References Cited in the file of this patent
UNITED STATES PATENTS

| 258,475 | Renson | May 23, 1882 |
| 2,008,805 | Van Buren | July 23, 1935 |

FOREIGN PATENTS

| 4,017 | Great Britain | of 1890 |
| 443,486 | France | July 16, 1912 |
| 734,954 | France | Apr. 13, 1932 |
| 453,108 | Italy | Nov. 17, 1949 |

OTHER REFERENCES

Monrad: Pasteurization and Milk Preservation, Winnetka, Ill., 1901, p. 12.